Jan. 31, 1939.   G. H. CHAMBERLAIN, JR   2,145,584
UNIVERSAL HEAD FOR CAMERAS
Filed Oct. 17, 1935   2 Sheets-Sheet 1
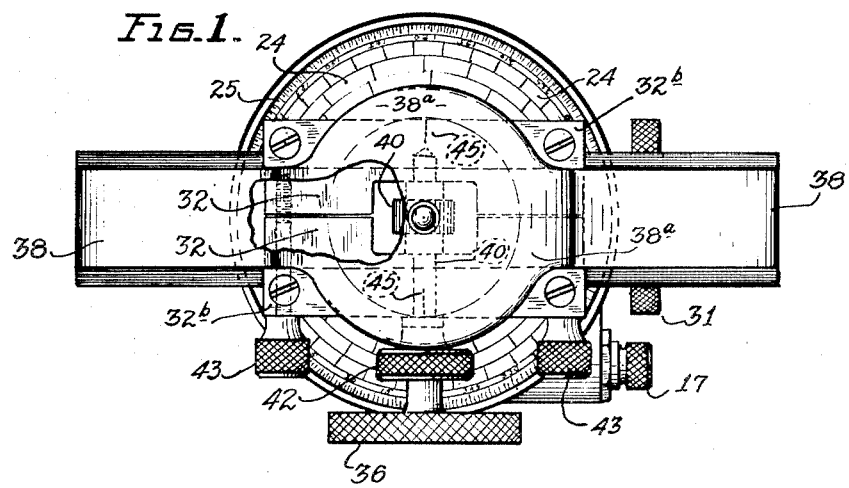
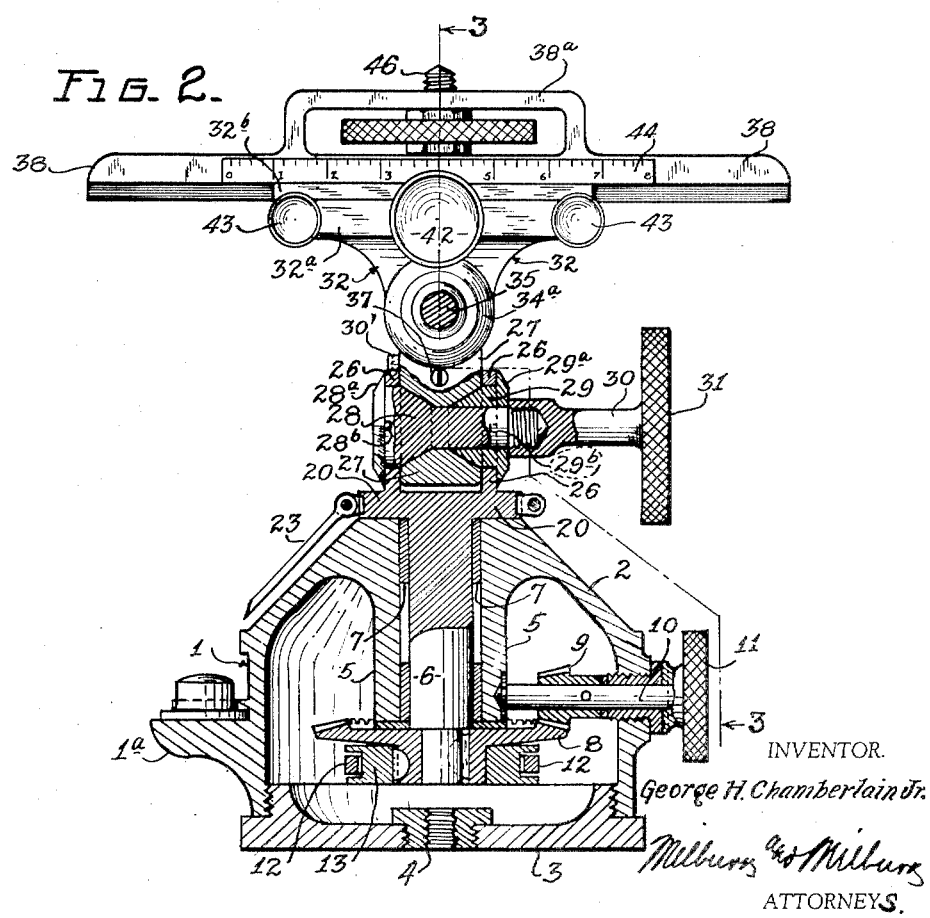
INVENTOR.
George H. Chamberlain Jr.
ATTORNEYS Jan. 31, 1939.  G. H. CHAMBERLAIN, JR  2,145,584
UNIVERSAL HEAD FOR CAMERAS
Filed Oct. 17, 1935  2 Sheets-Sheet 2
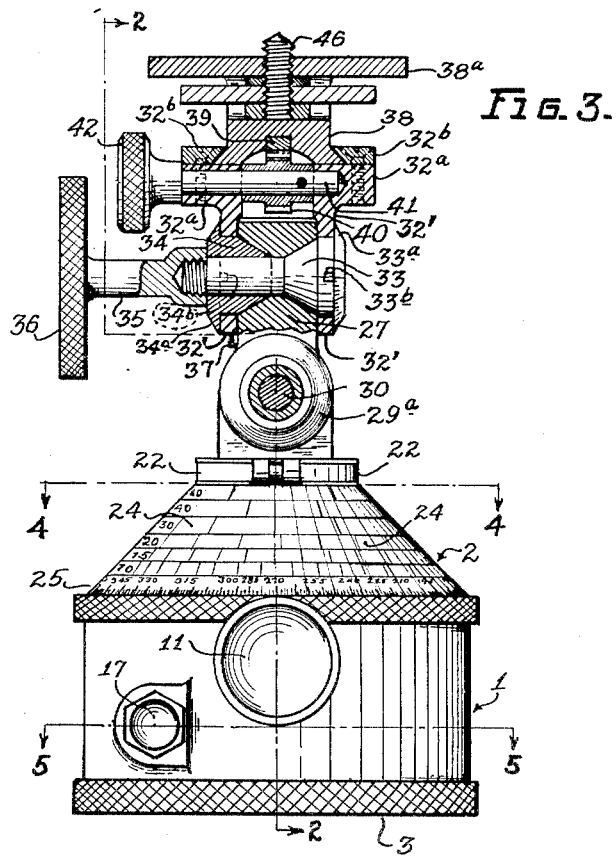
INVENTOR.
George H. Chamberlain Jr.
BY
ATTORNEYS.

Patented Jan. 31, 1939

2,145,584

UNITED STATES PATENT OFFICE 2,145,584

UNIVERSAL HEAD FOR CAMERAS

George H. Chamberlain, Jr., San Jose, Calif.

Application October 17, 1935, Serial No. 45,470

4 Claims. (Cl. 248—179)

This invention relates to an improved form of tripod head for a camera or the like.

The object is to provide a comparatively simple, compact and convenient structure which is capable of universal angular adjustment and which possesses also adjustments for taking stereoscopic and panoramic pictures.

It is also an object to provide efficient and convenient forms of mechanism for effecting these several adjustments, together with conveniently arranged means for indicating the degree of adjustment in each case.

A still further object is to provide readily manipulatable and dependable means for locking the device in the various positions to which it is adjusted.

Other objects will appear from the following description and claims when considered together with the accompanying drawings.

Fig. 1 is a top plan view of my device;
Fig. 2 is a view taken on line 2—2 of Fig. 3;
Fig. 3 is a view taken on line 3—3 of Fig. 2;
Figs. 4 and 5 are views taken on lines 4—4 and 5—5, respectively, of Fig. 3.

It is to be understood that the present disclosure is merely for purposes of illustration and that various other modifications and variations may be made without departing from the spirit of the present invention as herein set forth and claimed.

Referring to the drawings, the main body has a lower cylindrical portion 1 and a conical upper portion 2, the main body being hollow and closed at its bottom by the base 3 which has screw-threaded engagement therewith and which has a central screw-threaded bushing 4 for mounting the device upon the screw of a tripod in the usual manner.

The body 1 has a support 1ª with suitable means for mounting thereupon a bubble level or the like.

The main body has a downwardly and inwardly extending hollow bearing portion 5 which receives the spindle 6 and its bushing 7. The spindle 6 is adapted for swivel movement and carries the adjustable connections for changing the position of the camera or the like, as will be explained.

The lower end of spindle 6 has affixed thereto the bevel gear 8 which is adapted to be operated by the meshing bevel pinion 9 on the rotatable shaft 10. This shaft is mounted in a bushing in the wall 1 of the main body and has bearing at its inner end in a thrust washer in bearing portion 5. The shaft 10 is operated by the knob 11. Thus, by manipulation of the knob 11, the spindle can be turned to any extent desired about a vertical axis.

For the purpose of locking the spindle 6 in any position to which it is adjusted, the brake band 12 extends about the brake drum 13 which is affixed to the hub of bevel gear 8. The laterally extending ends of the brake band 12 have the threaded end of the shaft 14 extending therethrough and engaging one end of the band while the other end thereof abuts against the bushing 15. The other end of this bushing abuts against the screw-threaded companion bushing 16 which is mounted in the wall of the main body. The shaft 14 is manipulated by the knob 17 and has a washer 18 and pin 19 on its other end. Thus, upon releasing the brake band, the spindle is free to be turned and then the spindle can be locked in the adjusted position by tightening the band 12.

The spindle 6 has an enlarged portion 20 in the grooved periphery of which there is clamped the semi-circular companion strap members 22 so as to support the indicator finger 23 which extends parallel to the conical face 2. The face 2 is divided into a plurality of rings 24 each of which is subdivided into a certain number of parts corresponding to the angle of the field of a single exposure in the taking of sectional panoramic pictures. For instance, the uppermost ring has six sub-divisions of 60° each, the adjacent ring has nine sub-divisions of 40° each, and so on, until the lowermost ring has thirty-six sub-divisions of 10° each. According to the field or focal length of the lens of the particular camera, the spindle and the camera carried thereby, may be rotatably adjusted and set for a different number of successive exposures, the spindle being moved each time so as to register the edge of finger 23 with the marks of the particular ring. The finger 23 is also marked with the number of degrees corresponding to the extent of the subdivisions of the different rings 24. Also, at the bottom of the conical portion, there is provided a complete dial 25 thereabout which can be viewed and read at the end of the pointed finger 23.

Upstanding from the portion 20 are two parallel projections or ears 26 which are provided with registering apertures and are adapted to receive the link 27 for pivotal mounting therebetween. The link also has an aperture therethrough in registry with the apertures in the projections or ears 26 so as to receive the bolt pin 28. The link 27 at the two end portions of the aperture therethrough is of conical form and accommodates the correspondingly formed end portion of the bolt pin 28 and the bearing and washer member 29. The inter-engagement between the internally screw-threaded end of the shank portion 30 of the wheel 31, and the screw-threaded end of the bolt pin 28, serves to clamp these parts in adjusted position, the large ends of the bolt pins 28 and the bearing member 29 being formed with flange portions 28ª and 29ª respectively which are allowed slight clearance with respect to the ears 26 so as to ensure effective wedging and locking engagement between the conical surfaces without any strain upon the wheel nuts.

Either or both of the flange portions 28ª and 29ª may have their beveled marginal areas marked to serve as a dial to indicate the angle of adjustment. This dial may be read with respect to the slot of a screw head 30' or any other mark. The screw 30' serves also the purpose of determining the position of the link so as to be in registry with respect to the ears 26, that is, the screw-head 30' will engage the top edge of the ear 26 when these parts are assembled. The enlarged ends of the bolt pin 28 and the bearing member 29 are provided with lugs 28ᵇ and 29ᵇ respectively for registry with correspondingly formed slots in the edge of the apertured ears 26. In this way, these members may be properly assembled so as to position the dial properly with respect to the screw slot or other fixed mark. Also, this prevents rotation of the members 28 and 29 as the parts are drawn into engagement with each other in the manner explained.

The same manner of inter-engagement is provided also between the upper apertured end of the link 27 and the correspondingly apertured parallel ears 32' which depend from the under side of the slide base 32. That is, the upper end of link 27 has conical portions to receive the conical portions of the bolt pin 33 and the bearing and washer member 34. Each of these members is provided with a flange portion 33ª and 34ª for clamping engagement with the ears 32' and they also have lugs or projections 33ᵇ and 34ᵇ engaging recesses at the marginal periphery of the openings in the ears 32' so as to hold these members against rotation as the parts are drawn together by screw thread engagement of the shank portion 35 of the manipulating wheel 36. As before explained, the flange portions of the members 33 and 34 are beveled and one or both of them may be marked with a dial, and the slot of screw 37 or any other form of fixed mark may be used in connection with the dial. This screw, as in the other case, serves to determine the registering position of the parts as they are assembled.

As indicated in the drawings, the pivotal adjustments at the upper and lower ends of the link are arranged at ninety degrees to each other so that they together constitute virtually a means of universal adjustment.

The slide base 32 may be formed as one integral part or as two parts, as indicated in the drawings. These two parts each have a laterally extending top portion 32ª, both of which have overhanging beveled portions 32ᵇ forming a slide-way for the slide 38 which has correspondingly formed bevel edge portions for slide engagement and also releasable lock engagement with the portions 32ᵇ.

Along the middle part of the under side of the slide 38 there is a rack 39 with which there meshes a pinion 40 for operation thereof, this pinion being carried by the shaft 41 which is rotatably mounted in the slide base 32 and is adapted for manipulation by the hand wheel 42. The pinion and its shaft are mounted midway of the length of the slideway.

At the two ends of the slide-way there are provided the locking screws 43 which are adapted to draw the two parts of the slide-way towards each other and into clamping or locking engagement with the slide so as to hold the same in any position to which it may be adjusted by the rack and pinion mechanism. Sufficient clearance is allowed between the parts of the slide-way to permit such clamping engagement, as indicated in Fig. 1 of the drawings.

In case the slide-way should be formed as one piece, then it would be split at only one end and there would be required only one clamping screw at the split end thereof for drawing the same into clamping engagement with the slide. In which case, the pinion might be located at the other end of the slide-way instead of in the middle thereof as here shown.

Along one side of the slide there is provided one system of measurement, as for instance a metric scale 44, for determining the extent of lateral adjustment of the slide, and a fixed mark therefor will be provided upon the top of the slide-way at the point midway of the length thereof, as at 45. Along the other side of the slide there may be provided a scale of inches for the same purpose.

The lateral adjustment of the slide, upon which the camera is mounted, is for use in the taking of stereoscopic pictures, the slide and camera being moved to position for the view corresponding to that of the one eye and then moved to the position corresponding to the view of the other eye, as will be understood.

This slide movement is also useful in making fine adjustments for focusing when copying photographs or doing other close range work such as macro- and micro-photography. Also, when the device is arranged and set so that the slide occupies vertical position, it allows the camera or other instrument to be raised or lowered without re-setting the tripod or base upon which it is set.

The mount 38ª is spaced above the slide 38 and may be connected thereto by the integral leg portions as indicated. There is thus provided space for the head of the screw 46 which extends up through the mount for engagement with the threaded opening in the bottom of the camera.

By having the single link 27, the two pivotal adjustments about the axes through the ends thereof may be made very conveniently and quickly as they can be made at the same time while grasping the adjustable parts with the one hand and thereby preventing the parts from getting out of control during any such adjustment. Furthermore, this mechanism which affords the universal adjustment, is extremely simple and dependable, the conical engaging members proving very efficient.

It will be observed also that the link 27 is reversible, and that the bolt pins are duplicates as are the bearing and washer members. This facilitates manufacture and assembly of the parts.

The enlarged base serves to house the operating mechanism for the swivel connection for panoramic exposures and it also affords a convenient means for indicating and observing the degrees of movement according to the lens employed. This provision is still further facilitated by the special arrangement of the index upon the conical top part of the base and the finger which is thus so conveniently positioned in conjunction therewith.

Another improved feature consists in the structure and arrangement of the spindle 6 and its bearing engagement within and upon the main body, whereby there is ensured a swivel adjustment about a true axis.

The base cover affords a convenient means of assembling and inspecting the parts within the housing of the main body and at the same time serves as a means of attachment to the tripod.

Although generally used with a tripod yet my device can be set upon any base or mounted upon other laboratory supports or apparatus in any manner desired without a tripod.

It should be noted also that the several component parts of the universal movement are independent of each other so that the changing of one does not disturb the other adjustments or settings. This is especially important when this device is employed for engineering purposes.

The arrangement of brake band serves as an efficient locking means without any danger of cocking the parts off of true center.

Other advantages will be apparent to those who are familiar with the art to which the present invention relates.

What I claim is:

1. A universal head for tripod, comprising a body adapted for attachment to a tripod, intermediate support, a camera holding means upon said intermediate support, pivotal connections between said intermediate support and body and each including conical shaped engaging surfaces and being arranged at ninety degrees to each other so as to afford means of universal adjustment, and means for clamping the same in adjusted position, means for adjustment of said camera holding means transversely of the focal axis of the camera, means for locking the same in adjusted position, said intermediate support having a spindle engaging within said main body for swivel adjustment about the axis of said spindle, means housed within said main body for effecting adjustment of said spindle, and means for locking said spindle in adjusted position.

2. A universal head for tripod, comprising a body adapted for attachment to a tripod, intermediate support, a camera holding means upon said intermediate support, pivotal connections between said intermediate support and body and each including conical shaped engaging surfaces and being arranged at ninety degrees to each other so as to afford means of universal adjustment, and means for clamping the same in adjusted position, means for adjustment of said camera holding means transversely of the focal axis of the camera, means for locking the same in adjusted position, said intermediate support having a spindle engaging within said main body for swivel adjustment about the axis of said spindle, means housed within said main body for effecting adjustment of said spindle, and brake band mechanism housed within said main body for locking said spindle in adjusted position, said main body having a plurality of annular series of divisions, the divisions of each series being of equal degree and the several series having different numbers of divisions, an indicator member carried by said spindle and extending across and adapted for co-operation with all of said series of divisions for determining the extent of adjustment.

3. A universal head for tripod, comprising a body adapted for attachment to a tripod, intermediate support, a camera holding means upon said intermediate support, pivotal connections between said intermediate support and body and arranged at ninety degrees to each other so as to afford means of universal adjustment, means for clamping the same in adjusted position, said intermediate support having a spindle engaging within said main body for swivel adjustment about the axis of said spindle, said body having a plurality of concentrically arranged annular series of divisions, the divisions of each individual series being of equal degree, the divisions of different series being of different degree, and the several series having different numbers of divisions, an indicator member carried by said spindle and extending across and adapted for co-operation with all of said series of divisions for determining the extent of adjustment for taking sectional panoramic pictures with different lenses, means for effecting adjustment of said spindle, and means for locking said spindle in adjusted position.

4. A universal head for tripod, comprising a body member adapted for attachment to a tripod, an intermediate support member, a camera-holding means mounted upon said intermediate support member, a link member between said intermediate support member and body member, combined bearing and adjustable pivotal connections between the ends of said link member and said intermediate support and body members and each comprising a pair of spaced parallel ears on one of said members and a projection upon the other of said members, in each instance, for engagement between said ears, a bolt having a conical-shaped head and a conical-shaped clamping member engaging correspondingly shaped seat portions in said projection, and means for releasably clamping the parts in adjusted position, said conical-shaped members being non-rotatable with respect to the ears when in adjusted position, and the adjustable connections at the two ends of the link member being at ninety degrees to each other so as to afford universal adjustment.

GEORGE H. CHAMBERLAIN, Jr.

CERTIFICATE OF CORRECTION.

Patent No. 2,145,584.　　　　　　　　　　　　　　　　January 31, 1939.

GEORGE H. CHAMBERLAIN, JR.

It is hereby certified that error appears in the printed specification of the above numbered patent requiring correction as follows: Page 3, first column, line 59, claim 2, for the word "brake" read means; and second column, line 1, same claim, strike out the words band mechanism housed within said main body; and that the said Letters Patent should be read with this correction therein that the same may conform to the record of the case in the Patent Office.

Signed and sealed this 28th day of March, A. D. 1939.

Henry Van Arsdale.

(Seal)　　　　　　　　　　　　　　　　　　Acting Commissioner of Patents.